United States Patent
Wozniak et al.

(10) Patent No.: US 11,526,735 B2
(45) Date of Patent: Dec. 13, 2022

(54) NEUROMORPHIC NEURON APPARATUS FOR ARTIFICIAL NEURAL NETWORKS

(71) Applicant: International Business Machines Corporation, Armonk, NY (US)

(72) Inventors: Stanislaw Wozniak, Adliswil (CH); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 16/295,007

(22) Filed: Mar. 7, 2019

(65) Prior Publication Data

US 2020/0193276 A1   Jun. 18, 2020

Related U.S. Application Data

(60) Provisional application No. 62/780,261, filed on Dec. 16, 2018.

(51) Int. Cl.
  *G06N 3/06* (2006.01)
  *G06N 3/063* (2006.01)

(52) U.S. Cl.
  CPC .................... *G06N 3/063* (2013.01)

(58) Field of Classification Search
  CPC ................. G06N 3/063; G06N 5/02
  See application file for complete search history.

(56) References Cited

U.S. PATENT DOCUMENTS

| | | | | |
|---|---|---|---|---|
| 2011/0004579 A1* | 1/2011 | Snider | ............... | G06N 3/049 706/26 |
| 2015/0106311 A1* | 4/2015 | Birdwell | ............... | G06N 3/08 706/26 |
| 2015/0106314 A1* | 4/2015 | Birdwell | ............... | G06N 3/02 706/27 |
| 2015/0106315 A1* | 4/2015 | Birdwell | ............... | G06N 3/08 706/25 |
| 2015/0286925 A1* | 10/2015 | Levi | ............... | G06N 3/049 706/25 |

(Continued)

OTHER PUBLICATIONS

Henry Martin, "Spiking Neural Networks for Vision Tasks", Dec. 15, 2015, pp. 1-21. (Year: 2015).*

(Continued)

*Primary Examiner* — Paulinho E Smith
(74) *Attorney, Agent, or Firm* — Harrington & Smith

(57) ABSTRACT

A neuromorphic neuron apparatus includes an accumulation block and an output generation block. The apparatus has a current state variable corresponding to previously received one or more signals. The output generation block is configured to use an activation function for generating a current output value based on the current state variable. The accumulation block is configured to repeatedly: compute an adjustment of the current state variable using the current output value and a correction function indicative of a decay behaviour of a time constant of the apparatus; receive a current signal; update the current state variable using the computed adjustment and the received signal, the updated state variable becoming the current state variable; and cause the output generation block to generate a current output value based on the current state variable.

14 Claims, 3 Drawing Sheets

(56) References Cited

U.S. PATENT DOCUMENTS

2018/0174040 A1* 6/2018 Davies ............... G06N 3/08

OTHER PUBLICATIONS

Pantazi et al., "All-Memristive Neuromorphic Computing with Level-Tuned Neurons", pp. 1-13, Jul. 26, 2016 (Year: 2016).*
Merchant, "Intrinsically Evolvable Artificial Neural Networks", 2007, pp. 1-219 (Year: 2007).*
Jeong et al., "Memristor Devices for Neural Networks", Oct. 30, 2018, Journal of Physics D: Applied Physics, pp. 1-28 (Year: 2018).*
Indiveri et al., "Neuromorphic Silicon Neuron Circuits", May 2011, vol. 5 Article 73, pp. 1-23 (Year: 2011).*

\* cited by examiner

NEUROMORPHIC NEURON APPARATUS FOR ARTIFICIAL NEURAL NETWORKS

CROSS REFERENCE TO A RELATED PATENT APPLICATION

This patent application claims priority to U.S. Provisional Patent Application Ser. No. 62/780,261, filed on Dec. 16, 2018, the disclosure of which is incorporated by reference herein in its entirety.

BACKGROUND

The present disclosure relates to the field of computer systems, and more specifically, to a neuromorphic neuron apparatus for artificial neural networks.

Neural networks are a computational model used in artificial intelligence systems. Neural networks are based on multiple artificial neurons. Each artificial neuron is connected with one or more other neurons, and links can enhance or inhibit the activation state of adjoining neurons. Artificial neurons such as neurons of a spiking neural network (SNN) are provided with a firing threshold that must be exceeded by a membrane potential of the neurons in order to generate a spike.

SUMMARY

Various embodiments provide a neuromorphic neuron apparatus, computer program product, and method as described by the subject matter of the independent claims. Advantageous embodiments are described in the dependent claims. Embodiments of the present invention can be freely combined with each other if they are not mutually exclusive.

In one aspect, a neuromorphic neuron apparatus comprises an accumulation block and an output generation block, the apparatus having a current state variable corresponding to previously received one or more signals, the output generation block being configured to use an activation function for generating a current output value based on the current state variable. The accumulation block is configured to repeatedly
compute an adjustment of the current state variable using the current output value and a correction function indicative of a decay behavior of a time constant of the apparatus;
receive a current signal;
update the current state variable using the computed adjustment and the received signal, the updated state variable becoming the current state variable; and
cause the output generation block to generate a current output value based on the current state variable.

In another aspect, an artificial neural network comprises multiple layers, wherein at least one layer of the multiple layers comprises one or more neuromorphic neuron apparatus according to the preceding embodiment. The artificial neural network may, for example, be a SNN.

In another aspect, a method for a neuromorphic neuron apparatus comprises an accumulation block and an output generation block, the apparatus having a current state variable corresponding to previously received one or more signals, and a current output value based on the current state variable. The method comprises repeatedly
computing an adjustment of the current state variable using the current output value and a correction function indicative of a decay behavior of a time constant of the apparatus;
receiving a current signal;
updating the current state variable using the computed adjustment and the received signal, the updated state variable becoming the current state variable; and
causing the output generation block to generate a current output value based on the current state variable.

In another aspect, a computer program product comprises a computer-readable storage medium having computer-readable program code embodied therewith, the computer-readable program code configured to implement all of steps of the method according to preceding embodiments.

BRIEF DESCRIPTION OF THE SEVERAL VIEWS OF THE DRAWINGS

In the following, exemplary embodiments are explained in greater detail, by way of example only, making reference to the drawings in which.

DETAILED DESCRIPTION

Figure 1:
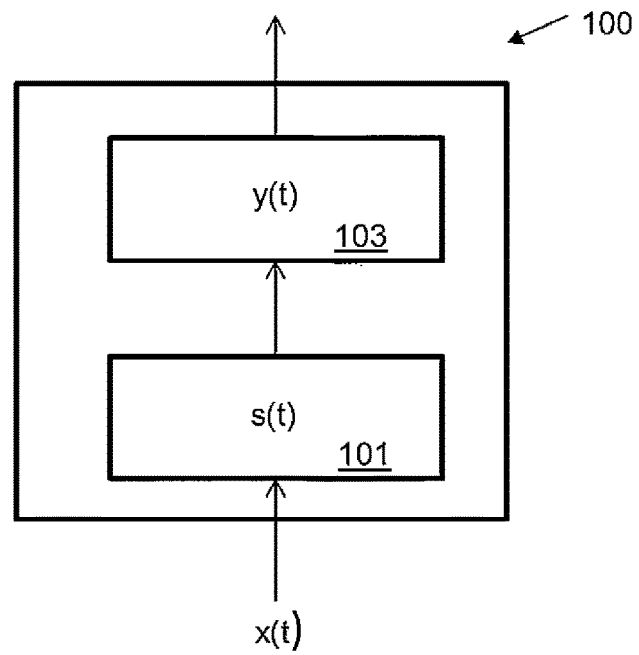
FIG. 1 illustrates a neuromorphic neuron apparatus in accordance with the present subject matter.

The descriptions of the various exemplary embodiments disclosed herein will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present apparatus may maintain or memorize a temporal context of the apparatus using at least two state variables. For example, the present apparatus may use two state variables, where the output value of the apparatus may be a state variable value. The state variables may be maintained by, for example, exchanging them through recurrent connections of the apparatus or by using other means such as memories such as memristive devices e.g. phase-change memory or other memory technologies. In the case of memristive devices, a state variable value may be represented in the device conductance. The present subject matter may enable an accurate and efficient processing of temporal data. For example, streams of temporal data may directly be fed into the apparatus and independently be processed by the apparatus. This may render the present apparatus applicable to tasks such as unsegmented, connected handwriting recognition or speech recognition. In addition, the present subject matter may provide an apparatus that makes the SNN dynamics easy to implement and to train. In particular, the present apparatus may enable a fast and simple training of SNNs that are built out of the present apparatus. This could increase the usage of the SNNs for practical applications and make use of many power-efficient neuromorphic SNN chips.

According to one embodiment, the accumulation block is configured to perform the updating using an activation function different from the activation function of the output generation block. Using two different activation functions for generating an output e.g. a spike, may further increase the range of application of the present subject matter.

According to one embodiment, the accumulation block is configured to receive from the output generation block a reset signal indicative of the current output value used for the computing of the adjustment. A signal as used herein may be a value.

According to one embodiment, the output generation block is configured to automatically provide or output to the accumulation block a reset signal indicative of the current output value used for the computing of the adjustment upon generating the current output value. These embodiments may, for example, be implemented using means for saving values of the state variables such as recurrent connections and memories.

According to one embodiment, the output generation block is configured to provide a reset signal indicative of the current output value used for the computing of the adjustment via a reset gate connecting the accumulation block and the output generation block. For example, an activation of the output generation block may control the resetting of the state variable by gating a self-looping connection at the accumulation block.

According to one embodiment, the accumulation block comprises an adder circuit, multiplication circuit and activation circuit, the multiplication circuit being configured to compute the adjustment, the adder circuit being configured to add the adjusted state variable to the received signal, the activation circuit being configured to perform the update using the result of the addition and to provide the updated state variable to the output generation block. This may enable an efficient and compact implementation of the accumulation block.

According to one embodiment, the output generation block is configured to generate the current output value by shifting the current state variable by a predefined bias value and applying the activation function on the shifted state variable. This may enable to take into account potential bias in the computations performed by the output generation block.

According to one embodiment, the received signal is a weighted sum of input values, using synaptic weights, wherein any of the synaptic weights, the bias value and the correction function is a trainable parameter.

According to one embodiment, the activation function of the output generation block is a step function. In this case, the output generation block may be a spiking block that generates binary values 0 or 1.

According to one embodiment, the activation function of the output generation block is a sigmoid function. This may enable to generalize the computational advantages of the present apparatus to the non-spiking case.

According to one embodiment, the accumulation block is configured to perform the updating using an activation function that provides values of the state variable in a predefined range of values. In one example, the activation function of the accumulation block may be a rectified linear activation function. In another example, the activation function of the accumulation block may be a linear pass-thru function.

According to one embodiment, the state variable is a membrane potential.

FIG. 1 illustrates a neuromorphic neuron apparatus 100 in accordance with an example of the present subject matter. The neuromorphic neuron apparatus 100 may be implemented using a neuromorphic hardware implementation. For example, the neuromorphic neuron apparatus may be a circuit using memristors to implement at least part of the present subject matter. The neuromorphic neuron apparatus 100 may alternatively be implemented by using analog or digital CMOS circuits.

The neuromorphic neuron apparatus 100 may be configured to receive a stream of signals (or time series) $x(t-n) \ldots x(t-3), x(t-2), x(t-1), x(t)$: For example, each of the signals $x(t-n) \ldots x(t)$ may be indicative of a respective image that has been acquired at respective time $t-n, \ldots t$. A received signal $x(t)$ of the stream may be a variable value. The variable value may be a combination of one or more input values. The combination of the input values may be a weighted sum of the input values. The weighted sum uses synaptic weights of respective input values. Each input value may be received at the neuromorphic neuron apparatus 100 via a synapse that weights the input value e.g. the received signal may be $x(t)=W(x1)*x1+W(x2)*x2+\ldots W(xn)*xn$, where x1 to xn are the input values and W1 are the synaptic weights. For example, the input values may be values indicative of a content of pixels of an image and the variable value may be indicative of one or more properties of the image.

The neuromorphic neuron apparatus 100 may be configured to process the received variable value. The neuromorphic neuron apparatus 100 may generate an output value based on the received variable value. In one example, the neuromorphic neuron apparatus 100 may be configured to generate spikes to encode values of a variable at each time instant in the generated spikes e.g. the neuromorphic neuron apparatus 100 may generate spikes for a scalar variable such as the gray-scale color of a pixel. The neuromorphic neuron apparatus 100 may, for example, be configured to perform a rate-based coding. The rate coding encodes information in the rate of the generation of spikes such that the firing rate is the basis of information. The output spiking rate of the neuromorphic neuron apparatus 100 may for example be analyzed or determined over a range of time. This may for example be done by analyzing a sequence of outputs such as sequence $y(t-2), y(t-1)$ and $y(t)$ generated for respective received signals $x(t-2), x(t-1)$ and $x(t)$ of a time period $(t-2, t)$. The analysis of the sequence of outputs may be performed by evaluating the following spiking rate loss $$MSE\left(\frac{1}{\Delta T}\bar{y}(a, b), \hat{y}_{Hz}\right).$$

$\Delta T$ is a predefined sampling time indicative of a time interval between two consecutive received signals. The spiking rate loss may be defined as a mean squared error (MSE) between the rate of the mean spiking output $\bar{y}(a, b)$, calculated over an analysis time period (ta, tb), and a target firing rate $\hat{y}_{Hz}$. Advantageously, a normalized spiking rate loss may be used for the analysis. The normalized spiking rate loss may be obtained for a normalized target 9 by normalizing the spiking rate by a maximum spiking rate $$\frac{1}{\Delta T}$$

as follows: $MSE(\bar{y}(a, b), \hat{y})$.

Furthermore, the neuromorphic neuron apparatus 100 may be configured to perform a timing-based coding. The timing-based coding encodes information in the timing of the spikes such that the exact spike timing is the basis of information.

For processing the received variable value and generating an output value based on the received variable value, the neuromorphic neuron apparatus 100 may be provided, in accordance with the present subject matter, with at least two distinct blocks. The process of generating the output value may be split between or collaboratively be performed by the two blocks. Providing multiple blocks may enable an accurate and focused control of the process of generating the output values. For example, each of the blocks of the neuromorphic neuron apparatus 100 may be associated with a time dependent state that indicates or represents the output of the block for a given received signal. The neuromorphic neuron apparatus 100 may be configured to memorize states defined for previous received signals and feed them back in the neuromorphic neuron apparatus 100 for defining a current state for a current received signal. This may, for example, be implemented using recurrent connections or memories.

In one example, the neuromorphic neuron apparatus 100 may comprise an accumulation block 101 and an output generation block 103. In order to generate an output value in accordance with the present subject matter, the neuromorphic neuron apparatus 100 involves a time dependent state variable s(t) (e.g. which may represent a membrane potential) that may be used to define the output value. The state variable s(t) may indicate the current activation level of the neuromorphic neuron apparatus 100. Incoming spikes may increase this activation level, and then either decaying over time or firing a spike.

For example, for each received signal x(t), a respective state variable s(t) may be computed by the accumulation block 101. The accumulation block 101 may be configured to use an activation function to compute the state variable s(t). The activation function may, for example, be the rectified linear activation function. The computed s(t) may be provided or output by the accumulation block 101 to the output generation block 103. The output generation block 103 may generate the output value y(t) depending on the value of the state variable s(t). The output generation block 103 may use another activation function for generating the output value y(t) depending on the value of the state variable s(t). The activation function of the output generation block 103 may be a step function or sigmoid function. For example, depending on the activation function, y(t) may be an integer or float value that is within the interval [0, 1]. For example, y(t)=Step (s(t)), where Step is the step activation function. As the neuromorphic neuron apparatus 100 may be biased because it may have an additional input with constant value b, the constant value b (bias value) may be taken into account. For example, the bias value b may be used for determining the output value y(t) as follows y(t)=Step(s(t)+b). This may enable an improved performance of the neuromorphic neuron apparatus 100.

Thus, for each received signal x(t) of the stream x(t−n) . . . x(t−3), x(t−2), x(t−1), x(t), the neuromorphic neuron apparatus 100 may be configured to provide, in accordance with the present subject matter, the state variable s(t) using the accumulation block 101 and an output value y(t) using the output generation block 103.

For computing the state variable s(t) by the accumulation block 101, an initialization of the neuromorphic neuron apparatus 100 may be performed. The initialization may be performed such that before receiving any signal at the neuromorphic neuron apparatus 100, the state variable s(0) and the output variable y(0) may be initialized to respective predefined values. This may enable an implementation based on feedbacks from previous states of the neuromorphic neuron apparatus 100 as follows.

The accumulation block 101 may be configured to compute the state variable s(t) taking into account a previous value of the state variable e.g. s(t−1) and a previous output value e.g. y(t−1). The previous values of the state variable and the output value s(t−1) and y(t−1) may be the values determined by the neuromorphic neuron apparatus 100 for a previously received signal x(t−1) as described herein. For example, the accumulation block 103 may be configured to compute the state variable s(t) for the received signal x(t) as follows: s(t)=g(x(t)+s(t−1)⊙(1−y(t−1))), where g is the activation function of the accumulation block. For the very first received signal x(1), initialized values s(t−1)=s(0) and y(t−1)=y(0) may be used to compute the state variable s(1). The formula s(t−1)⊙(1−y(t−1)) is an adjustment of the state variable s(t−1).

The received signal x(t) may induce a current into the neuromorphic neuron apparatus 100. Depending on the current level, the state variable s(t) may decay or fall depending on the time constant of the neuromorphic neuron apparatus 100. This decay may for example be taken into account by the accumulation block 101 for computing the adjustment. For that, the adjustment of s(t−1) may be provided as follows: l(τ)⊙s(t−1)⊙(1−y(t−1)), where l(τ) is a correction function that takes into account the decay behavior of the state variable s(t) with the time constant τ. Thus, the accumulation block 101 may be configured to compute s(t) as follows: s(t)=g(x(t)+l(τ)⊙s(t−1)⊙(1−y(t−1))), where g is the activation function of the accumulation block. The values of l(τ) may for example be stored in a memory (not shown) of the neuromorphic neuron apparatus 100. For example, the correction function may be defined as follows $$l(\tau) = \left(1 - \frac{\Delta T}{\tau}\right),$$

where ΔT is the sampling time.

Figure 2:
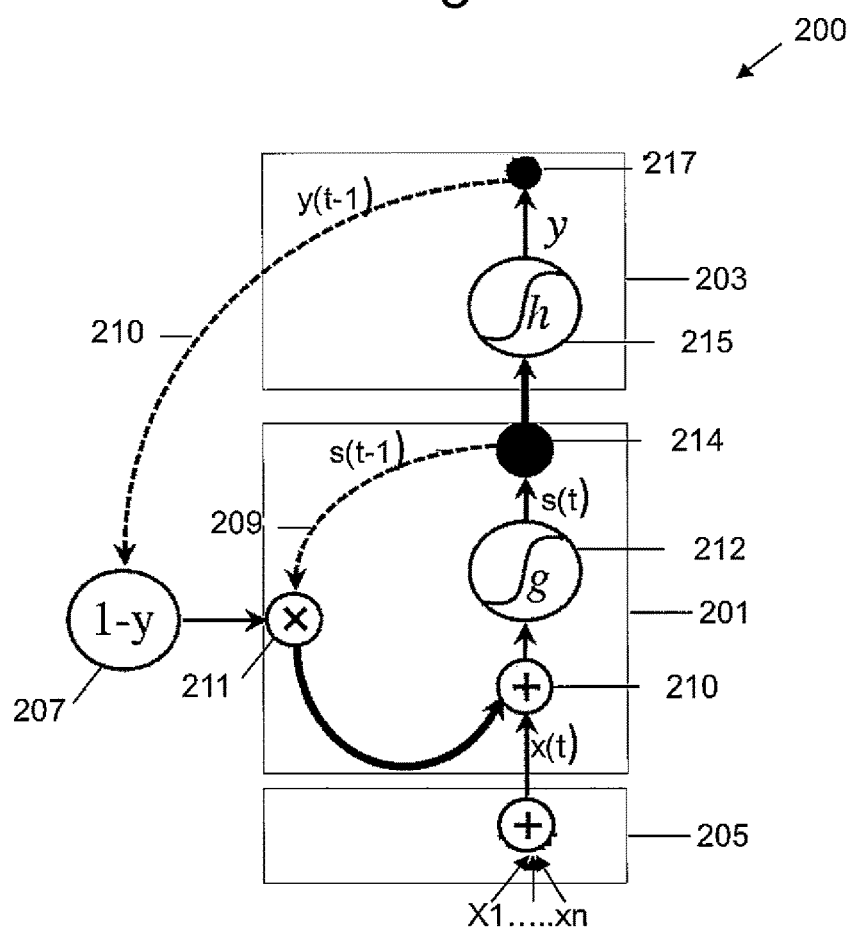
FIG. 2 illustrates a neuromorphic neuron apparatus in accordance with the present subject matter.

FIG. 2 illustrates an example implementation of a neuromorphic neuron apparatus 200 in accordance with the present subject matter. FIG. 2 shows the status of the neuromorphic neuron apparatus 200 after receiving a signal x(t).

The neuromorphic neuron apparatus 200 comprises an accumulation block 201 and an output generation block 203. The neuromorphic neuron apparatus 200 further comprises a summing block 205.

The summing block 205 is configured to receive weighted input values W(x1)*x1, W(x2)*x2 . . . W(xn)*xn representative of an object at time t (e.g. an image). The summing block 205 may be configured to perform the sum of the received weighted values x(t)=W(x1)*x1+W(x2)*x2+ . . . W(xn)*xn, and the resulting variable value x(t) is provided or output by the summing block 205 to the accumulation block 201.

The accumulation block 201 comprises an adder circuit 210, multiplication circuit 211, and activation circuit 212. The multiplication circuit 211 may for example be a reset gate. The accumulation block 201 may be configured to output at the branching point 214, the computed state variable in parallel to the output generation block 203 and to the multiplication logic 211. The connection 209 between the branching point 214 and the multiplication logic 211 is shown as a dashed line to indicate that the connection 209 is with a time-lag. That is, at the time the neuromorphic neuron apparatus 200 is processing a received signal x(t) to generate corresponding s(t) and y(t), the connection 209 may transmit a value of a previous state variable s(t−1).

The output generation block 203 may comprise an activation logic 215. The output generation block 203 may be configured to receive a state variable from the accumulation block 201. Based on the received state variable, the output generation block 203 may generate and provide or output an output value at a branching point 217 in parallel to another neuron apparatus, and to a reset module 207 of the neuromorphic neuron apparatus 200. The reset module 207 may be configured to generate a reset signal from the received output value and provide the reset signal to the multiplication logic 211. For example, for a given output value y(t−1), the reset module may generate a reset signal indicative of a value 1−y(t−1). The connection 210 is shown as a dashed line to indicate that the connection 210 is with a time-lag. That is, at the time the neuromorphic neuron apparatus 200 is processing a received signal x(t) to generate corresponding s(t) and y(t), the connection 210 may transmit a previous output value y(t−1). The connections 209 and 210 may enable a feedback capability to the neuromorphic neuron apparatus 200. In particular, the connection 209 may be a self-looping connection within the accumulation block and the connection 210 may activate a gating connection for performing the state reset.

Upon receiving the state variable value s(t−1) and the output value y(t−1), the multiplication logic 211 may be configured to compute an adjustment as follows: $l(\tau) \odot s(t-1) \odot (1-y(t-1))$. The adjustment computed by the multiplication circuit 211 is output and fed to the adder circuit 210. The adder circuit 210 may be configured to receive the adjustment from the multiplication circuit 211 and the signal x(t) from the summation block 205. The adder circuit 210 may further be configured to perform the sum of the received adjustment and the signal as follows: $x(t)+l(\Sigma) \odot s(t-1) \odot (1-y(t-1))$. This sum is provided or output by the adder circuit 210 to the activation circuit 212. The activation circuit 212 may be configured to receive the computed sum from the adder circuit 210. The activation circuit 212 may be configured to apply its activation function on the computed sum in order to compute the state variable s(t) as follows: $s(t)=g(x(t)+l(\tau) \odot s(t-1) \odot (1-y(t-1)))$. The resulting state variable s(t) may be output in parallel to the activation circuit 215 of the output generation block 203 and to the multiplication circuit 211 (the outputting to the multiplication circuit 211 may be useful for a next received signal x(t+1)). The activation circuit 215 may be configured to receive the state variable s(t) and to generate from the state variable s(t) an output value y(t) using its activation function. The generated output value may be output to the reset module 207 for usage for a next received signal x(t+1).

Figure 3:
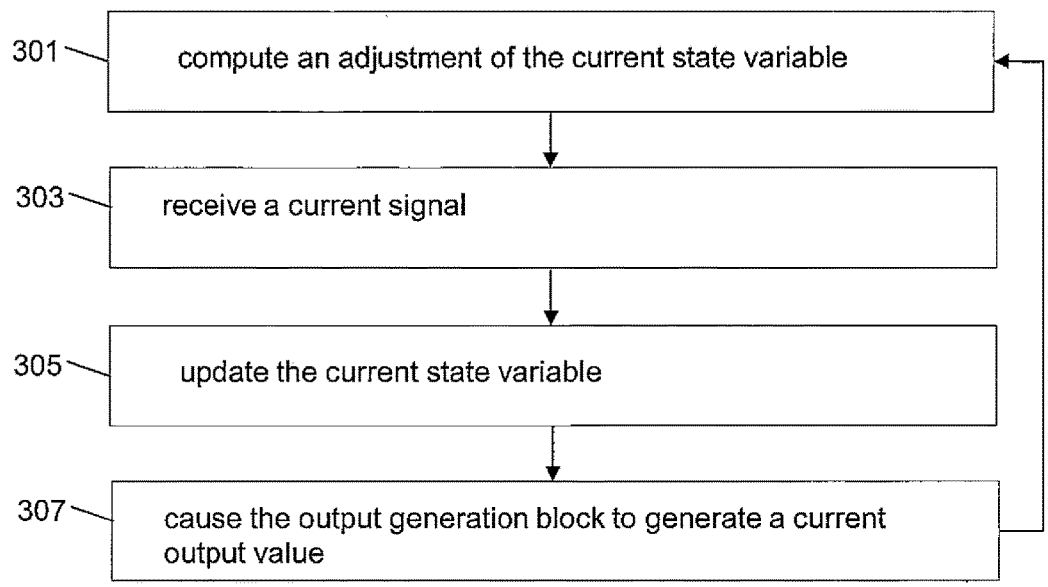
FIG. 3 is a flowchart of a method for generating an output value by a neuromorphic neuron apparatus.

FIG. 3 is a flowchart of a method for generating an output value by a neuromorphic neuron apparatus comprising an accumulation block and an output generation block. The neuromorphic neuron apparatus has a state variable s(0) and output value y(0) that are initialized to respective predefined values (e.g. s(0)=0 and y(0)=0). For example, before receiving and processing any signals, the neuromorphic neuron apparatus may have an initial configuration that has initial values s(0) and y(0).

In step 301, the accumulation block may compute an adjustment of the current state variable s(0) using the current output value y(0) and a correction function indicative of a decay behavior of a time constant of the neuromorphic neuron apparatus. For example, the adjustment may be computed as follows: $l(\tau) \odot s(0) \odot (1-y(0))$.

In step 303, the accumulation block may receive a current signal x(1). In another example, the signal x(l) may be received before or in parallel to the computation step 301.

In step 305, the current state variable s(0) may be updated using the computed adjustment and the received signal x(l). For example, the updated value s(1) may be obtained as follows: $s(1)=g(x(1)+l(\tau) \odot s(0) \odot (1-y(0)))$. And, s(1) becomes, thus, the current state variable.

In step 307, the accumulation block may cause the output generation block to generate a current output value y(1) based on the current state variable s(1).

Steps 301-307 may be repeated for each received subsequent signal x(t). For example, in a first iteration used for processing a subsequent signal x(2), the values s(l) and y(l) may be the current values of the state variable and the output. In a second iteration used for processing a subsequent signal x(3), the values s(2) and y(2) may be the current values of the state variable and the output and so on.

As described herein, the computation of the output values y(t) may involve one or more parameters such as the weights W, the correction function $l(\tau)$ and the bias value b. At least one of those parameters may be obtained by performing the training as described with reference to FIGS. 4A-B.

Figure 4A:
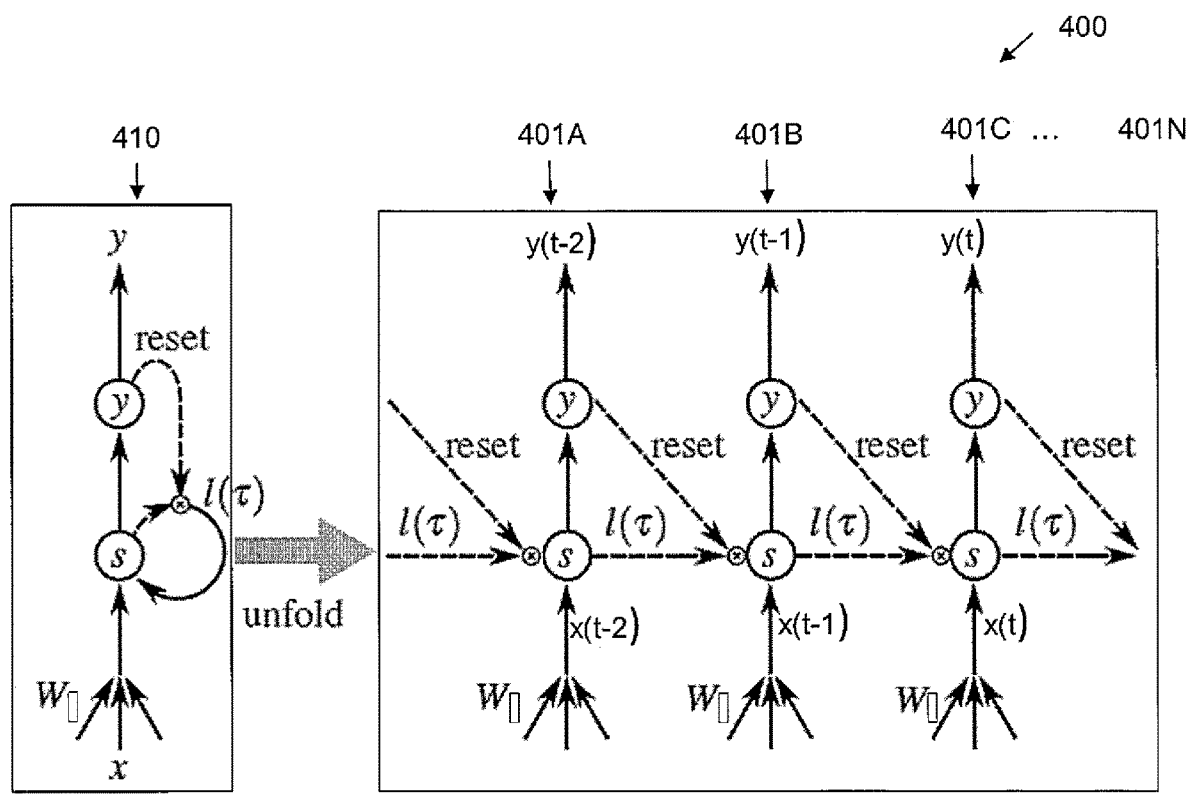
FIG. 4A is a diagram illustrating a training method in accordance with the present subject matter.

FIG. 4A is a diagram illustrating an example method for training a given network that comprises a number nn of neuromorphic neuron apparatuses 410 of the present subject matter using a backpropagation through time (BPTT) technique. For example, nn=1. In another example, nn≥1. The BPTT technique may use or require an unrolled structure of the given network which is shown as training structure 400 of FIG. 4A. The training structure 400 may be generated, for enabling the training by the BPTT technique, using the neuromorphic neuron apparatus 410. The training structure 400 may, for example, comprise a layer 401A-N for each time step in a predefined time interval. The generated training structure 400 may, for example, be a software implemented structure. The generated training structure 400 may be trained for providing the values of the parameters W and b. In this example, the correction function $l(\tau)$ may be fixed to a predefined value. The output generation block of the apparatus of a given layer of the training structure 400 is configured to provide the output value to a multiplication circuit of another apparatus of the neighboring layer of the training structure (as shown in FIG. 4A).

Each of the neuromorphic neuron apparatuses of the training structure 400 may use a step activation function or a sigmoid activation function for the generation of the output value y(t). In case the neuromorphic neuron apparatus uses a step activation function, it may be denoted as spiking neural unit (SNU). In case the neuromorphic neuron apparatus uses a sigmoid activation function, it may be denoted a soft SNU (sSNU).

Figure 4B:
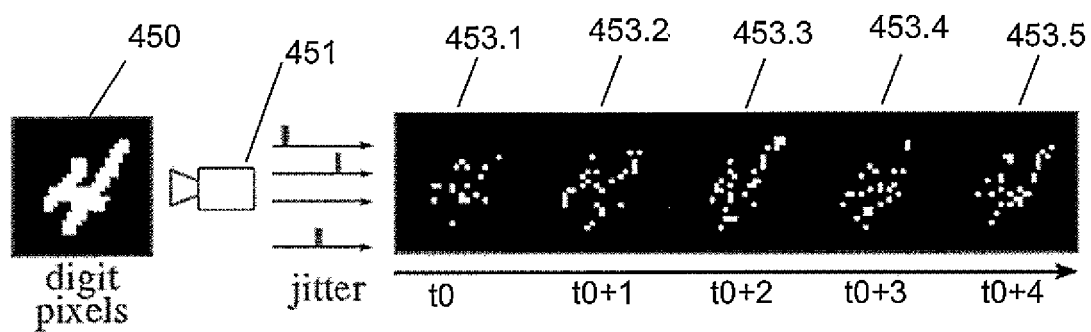
FIG. 4B illustrates a method for obtaining a sequence of jittered MNIST images.

The training dataset may be generated from MNIST images 450, wherein each image has a predefined number of pixels representing a handwritten digit (e.g. 4) e.g. the training dataset may be generated using 60000 MNIST images 450. In order to provide a temporal variation of the handwritten digit, a succession of simulated MNIST images 453.1-453.5 may be generated from each MNIST image 450 that correspond to five consecutive time instances of the input signal of the training structure 400 (401A-401E). This may for example be done using an asynchronous camera 451. For example, in order to provide the temporal variation of the handwritten digit, inputs indicative of the handwritten digit may be provided as spikes from the asynchronous camera 451. For example, each input image pixel belonging to the handwritten digit is defined as a pixel having a positive intensity value and the camera 451 sends a corresponding spike at a random time instance. As a result, the camera 451 conveys jittered information about the digits as illustrated in FIG. 4B. For example, at time t0 the camera 451 has sent spikes for a set of pixels of the handwritten digit to the training structure 400, which is equivalent to provide pixels of MNIST image 453.1 as input to the training structure 400. This can be referred to as a process of transforming the MNIST image 450 to the jittered MNIST image 453.1. At time t0+1, spikes of another set of pixels are generated and so on.

For example, the dataset may form a continuous stream such that the spikes representing a consecutive pattern come directly after the preceding pattern. Thus, the training structure 400 may operate with a nonzero initial state and has to identify consecutive digits without receiving explicit information when the digit at the input has changed e.g. this may enable that the BPTT unrolling may be done not only per single, but also for a longer stream of inputs.

The training structure 400 may, for example, be generated from an artificial neural-network structure with 7 layers, wherein the 7 layers have 784, 256, 256, 256, 256, 256, 10 neuromorphic neuron apparatuses, in accordance with the present subject matter, respectively. The output layer has 10 neuromorphic neuron apparatuses representing the 10 possible digits 0 to 9, and the input layer has 784 neuromorphic neuron apparatuses representing the number of pixels in the MNIST image 450. The first network layer may process a respective jittered MNIST image 453.1, 453.2, 453.3, 453.4 and 453.5 in respective time steps t0, t0+1, t0+2, t0+3, t0+4.

In addition, the value of $l(\tau)$ is fixed to 0.8 and the network structure 400 is trained such that it can learn the values of trainable parameters W and b. To enable batching during the training (e.g. in order to avoid using a continuous stream of 60000 training images), the training structure 400 may be trained on sequences formed by feeding a random digit to initialize the state variable s(t) first and then consecutively presenting training digits. For example, for each epoch, the training set of 60000 MNIST images which is jittered over 5 time steps is presented in batches of 15 sequences. The learning is performed using a stochastic gradient descent (SGD) technique with a learning rate a=0.2. To assess the consistency of the results, the training structure 400 is executed for 10 different random weight initializations.

Figure 4C:
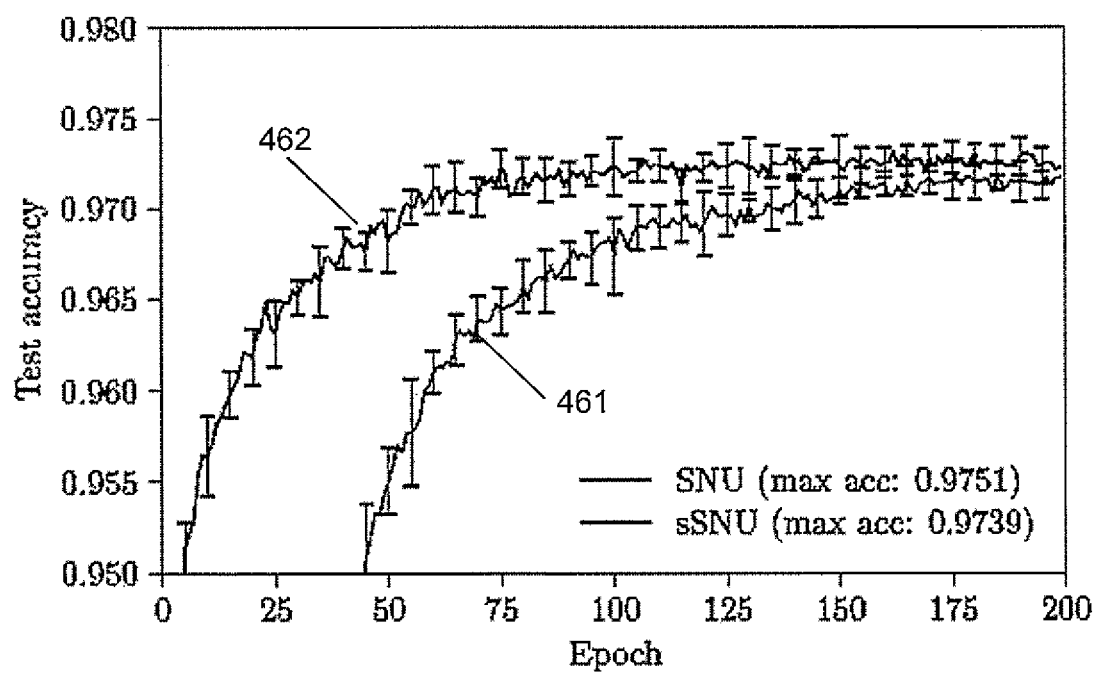
FIG. 4C is a plot showing the test accuracy of an example SNN in accordance with the present subject matter.

The resulting trained parameters W and b are used to evaluate the performance of the network comprising neuronal structure(s) 410 using test data. The test accuracies may be determined using the normalized spiking rate loss. FIG. 4C is a plot of the mean test accuracy together with the standard deviation error bars as a function of the number of epochs for the network structure 410 using SNUs (462) and for the SNN 410 using sSNUs (461). FIG. 4C indicates that the performance of the network structure having sSNUs is 97.39% and the performance of the network structure having SNUs is 97.51%. These performances indicate that the network comprising structures 410 can be trained in an efficient and simple way using training structures such as 400.

Various embodiments are specified as indicated below.

A neuromorphic neuron apparatus comprises an accumulation block and an output generation block, the apparatus having a current state variable corresponding to previously received one or more signals, the output generation block being configured to use an activation function for generating a current output value based on the current state variable; the accumulation block being configured to repeatedly compute an adjustment of the current state variable using the current output value and a correction function indicative of a decay behavior of a time constant of the apparatus; receive a current signal; update the current state variable using the computed adjustment and the received signal, the updated state variable becoming the current state variable; and cause the output generation block to generate a current output value based on the current state variable.

The accumulation block may be configured to perform the updating using an activation function different from the activation function of the output generation block.

The accumulation block may be configured to receive from the output generation block a reset signal indicative of the current output value used for the computing of the adjustment.

The output generation block may be configured to automatically provide to the accumulation block a reset signal indicative of the current output value used for the computing of the adjustment upon generating the current output value.

The output generation block may be configured to provide a reset signal indicative of the current output value used for the computing of the adjustment via a reset gate connecting the accumulation block and the output generation block.

The accumulation block may comprise an adder circuit, multiplication circuit and activation circuit, the multiplication circuit being configured to compute the adjustment, the adder circuit being configured to add the adjusted state variable to the received signal, the activation circuit being configured to perform the update using the result of the addition and to provide the updated state variable to the output generation block.

The output generation block may be configured to generate the current output value by shifting the current state variable by a predefined bias value and applying the activation function on the shifted state variable.

The received signal may be a weighted sum of input values using synaptic weights, wherein any of the synaptic weights, the bias value and the correction function is a trainable parameter.

The activation function of the output generation block may be a step function.

The activation function of the output generation block may be a sigmoid function.

The accumulation block may be configured to perform the updating using an activation function, the activation function being a rectified linear activation function.

The state variable may be a membrane potential.

An artificial neural network comprises multiple layers, wherein at least one layer of the multiple layers comprises one or more neuromorphic neuron apparatus as described herein.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM); a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A neuromorphic neuron apparatus comprising;
at least one memory having computer readable code thereon;
at least one processor; and
an accumulation block and an output generation block, the apparatus having a current state variable corresponding to one or more signals, the output generation block being configured to use an activation function for generating a current output value based on the current state variable, wherein the at least one processor causes, in response to retrieval and execution of the computer readable code, the accumulation block to, at least once:
compute an adjustment of the current state variable using the current output value and a correction function indicative of a decay behavior of a time constant of the apparatus;
receive a current signal;
update the current state variable using the computed adjustment and the received signal, the updated state variable becoming the current state variable; and
cause the output generation block to generate a current output value based on the current state variable;
wherein the accumulation block is configured to perform the updating using an activation function different from the activation function of the output generation block.

2. The apparatus of claim 1, the accumulation block being configured to receive from the output generation block a reset signal indicative of the current output value used for the computing of the adjustment.

3. The apparatus of claim 1, the output generation block being configured to automatically provide to the accumulation block a reset signal indicative of the current output value used for the computing of the adjustment upon generating the current output value.

4. The apparatus of claim 1, the output generation block being configured to provide a reset signal indicative of the current output value used for the computing of the adjustment via a reset gate connecting the accumulation block and the output generation block.

5. The apparatus of claim 1, the accumulation block comprising an adder circuit, multiplication circuit and activation circuit, the multiplication circuit being configured to compute the adjustment, the adder circuit being configured to add the adjusted state variable to the received signal, the activation circuit being configured to perform the update using the result of the addition and to provide the updated state variable to the output generation block.

6. The apparatus of claim 1, the output generation block being configured to generate the current output value by shifting the current state variable by a predefined bias value and applying the activation function on the shifted state variable.

7. The apparatus of claim 6, wherein the received signal is a weighted sum of input values using synaptic weights, wherein any of the synaptic weights, the bias value and the correction function is a trainable parameter.

8. The apparatus of claim 1, wherein the activation function of the output generation block is a step function.

9. The apparatus of claim 1, wherein the activation function of the output generation block is a sigmoid function.

10. The apparatus of claim 1, the accumulation block being configured to perform the updating using an activation function, the activation function being a rectified linear activation function.

11. The apparatus of claim 1, the state variable being a membrane potential.

12. An artificial neural network comprising multiple layers, wherein at least one layer of the multiple layers comprises one or more neuromorphic neuron apparatus of claim 1.

13. A method for a neuromorphic neuron apparatus, the apparatus comprising at least one memory having computer readable code thereon, at least one processor, and an accumulation block and an output generation block, the apparatus having a current state variable corresponding to one or more signals, and a current output value based on the current state variable, wherein the at least one processor causes, in response to retrieval and execution of the computer readable code, the accumulation block to perform, at least once,
computing an adjustment of the current state variable using the current output value and a correction function indicative of a decay behavior of a time constant of the apparatus;
receiving a current signal;
updating the current state variable using the computed adjustment and the received signal, the updated state variable becoming the current state variable; and
causing the output generation block to generate a current output value based on the current state variable;
wherein the accumulation block is configured to perform the updating using an activation function different from the activation function of the output generation block.

14. A computer program product comprising a non-transitory computer-readable storage medium having computer-readable program code embodied therewith, the computer-readable program code configured to implement the steps of the method according to claim 13.

* * * * *